United States Patent
Sundaram (10) Patent No.: US 10,083,313 B2
(45) Date of Patent: Sep. 25, 2018

(54) REMOTE MODIFICATION OF A DOCUMENT DATABASE BY A MOBILE TELEPHONE DEVICE

(71) Applicant: SAP SE, Walldorf (DE)

(72) Inventor: P. Meenakshi Sundaram, Walldorf (DE)

(73) Assignee: SAP SE, Walldorf (DE)

( * ) Notice: Subject to any disclaimer, the term of this patent is extended or adjusted under 35 U.S.C. 154(b) by 399 days.

(21) Appl. No.: 14/957,071

(22) Filed: Dec. 2, 2015

(65) Prior Publication Data
US 2017/0076107 A1    Mar. 16, 2017

(30) Foreign Application Priority Data
Sep. 14, 2015  (EP) .................................. 15185110

(51) Int. Cl.
*G06F 21/62* (2013.01)
*G06F 17/30* (2006.01)
(Continued)

(52) U.S. Cl.
CPC .... *G06F 21/6218* (2013.01); *G06F 17/30011* (2013.01); *G06F 17/30575* (2013.01);
(Continued)

(58) Field of Classification Search
CPC .......... G06F 17/30011; G06F 21/6218; G06F 17/30575; G06F 21/6272; H04W 4/18;
(Continued)

(56) References Cited

U.S. PATENT DOCUMENTS 9,716,861 B1 *  7/2017  Poel ......................... H04N 7/15
2005/0144195 A1  6/2005  Hesselink et al.
(Continued)

FOREIGN PATENT DOCUMENTS

EP            0 986 225        3/2000

*Primary Examiner* — Kambiz Zand
*Assistant Examiner* — Benjamin A Kaplan
(74) *Attorney, Agent, or Firm* — Harness, Dickey & Pierce, P.L.C.

(57) ABSTRACT

The disclosure provides for a telecommunication method using a communication system, wherein the communication system comprises: a main database system; a local database system; a first network connection for exchanging data between the main database system and the local database system, wherein the main database system and the local database system are separated by a first firewall; a handheld telecommunications device with digital mobile telecommunication connection to the local database system. The method includes: receiving a document database by the main database system; receiving a set of permissions for the document database for a group of users; generating a local database instance on the local database system for an external user; copying user permissions from the main database system to the local database; copying a portion of the document database to the local database instance; sending a modification request from the handheld communication device to the local database system; and forwarding the modification request from the local database instance to the document database if the modification request is allowed by the user permissions; modifying the document database using the modification request from the local database system to the main database system if the modification request is allowed by the set of permissions; and synchronizing the portion of the document database with the modified document database through the first database tunnel.

14 Claims, 4 Drawing Sheets

(51) Int. Cl.
*H04W 12/08* (2009.01)
*H04W 4/18* (2009.01)
*H04L 29/06* (2006.01)

(52) U.S. Cl.
CPC ...... *G06F 21/6272* (2013.01); *H04L 63/0209* (2013.01); *H04L 63/029* (2013.01); *H04L 63/102* (2013.01); *H04L 63/104* (2013.01); *H04W 4/18* (2013.01); *H04W 12/08* (2013.01); *H04L 63/0272* (2013.01)

(58) Field of Classification Search
CPC .. H04W 12/08; H04L 63/029; H04L 63/0209; H04L 63/102; H04L 63/104; H04L 63/0272
USPC .......................................................... 726/4
See application file for complete search history.

(56) References Cited

U.S. PATENT DOCUMENTS

| | | | |
|---|---|---|---|
| 2011/0016387 A1 | 1/2011 | Mundy et al. | |
| 2013/0218829 A1 | 8/2013 | Martinez | |
| 2013/0246901 A1* | 9/2013 | Massand | G06F 17/24 715/229 |
| 2015/0026815 A1* | 1/2015 | Barrett | G06F 21/00 726/26 |
| 2015/0222665 A1 | 8/2015 | Eberlein et al. | |
| 2015/0356277 A1* | 12/2015 | Barber | G06F 21/10 726/28 |

* cited by examiner

REMOTE MODIFICATION OF A DOCUMENT DATABASE BY A MOBILE TELEPHONE DEVICE

PRIORITY CLAIM

This application claims benefit of foreign priority in accordance with 35 U.S.C. 119(b) to EP application No. 15185110.2 filed on Sep. 14, 2015.

FIELD OF THE DISCLOSURE

The disclosure relates to digital mobile telecommunications, in particular to secure communication between a mobile telephone device and a document database.

BACKGROUND AND RELATED ART

Many times it may be beneficial to have multiple users or applications access a document or a database within an electronic storage or system. This may be straight forward if all users or applications have direct access to the electronic system. However if the user or application is not trusted, it may not be wise to grant permission to access the electronic system to that un-trusted user.

SUMMARY

The disclosure provides for a telecommunication method, a database system, and a communication system in the independent claims. Embodiments are given in the dependent claims.

As will be appreciated by one skilled in the art, aspects of the present disclosure may be embodied as an apparatus, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD), Digital Versatile Disks (DVD), and Blu-Ray Disc (BD), for example CD-ROM, CD-RW, CD-R, DVD-ROM, DVD-RW, DVD-R, BD-R, or BD-RE disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer memory or memory is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present disclosure. Computer executable code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block or a portion of the blocks of the flowchart, illustrations, and/or block diagrams, can be implemented by computer program instructions in form of computer executable code when applicable. It is further under stood that, when not mutually exclusive, blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In one aspect the disclosure provides for a telecommunication method using a communication system. The communication system comprises a main database system. The communication system further comprises a local database system. The communication system further comprises a first network connection for exchanging data between the main database system and the local database system. The main database system and the local database system are separated by a first firewall. The communication system further comprises a handheld telecommunications device. The telecommunication system further comprises a digital mobile telecommunications connection between the handheld telecommunications device and the local database system. The local database system and the handheld telecommunications device are separated by a second firewall. The digital mobile telecommunication connection tunnels through the second firewall.

The method comprises receiving a document database in the main database system. The document database comprises multiple entries. The method further comprises receiving a set of permissions for the document database. The set of permissions specify read permission and write permissions for each of the multiple entries separately for each of a group of users. The method further comprises generating a local database instance on the local database system for an external user. The external user is one of the group of users. The method further comprises generating user permissions for the local database instance by the main database system. The user permissions are a subset of the set of permissions that grand read or write permissions to the external user. For example not all of the set of permissions will have permissions that allow the external user to read and/or write various elements of the multiple entries. The user permissions are permissions only where the external user has read or write permissions.

The method further comprises copying the user permissions from the main database system to the local database instance by pushing the set of user permissions through a database tunnel. The database tunnel tunnels through the first firewall. The method further comprises copying a portion of the document database from the main database system to the local database instance by pushing the portion through the database tunnel. The portion is selected from the entries of the document database which are present in the user permissions. In other words the portion of the document database is a subset of the document database that the external user has read or write permissions for.

The method further comprises sending a modification request from the handheld communication device to the local database system through the digital mobile telecommunication connection. The modification request specifies a modification of the portion of the document database. The method further comprises forwarding the modification request from the local database instance to the document database if the modification request is allowed by the user permissions. In this step the modification request is only forwarded if the modification request would be allowed by the user permissions. For example if one portion of the modification request requests modifying a portion of the document that the external user does not have write permissions for then the modification request may not be forwarded.

The method further comprises modifying the document database using the modification request from the local database system to the main database system if the modification request is allowed by the set of permissions. The method further comprises synchronizing the portion of the document database with the modified document database through the first database tunnel.

This embodiment may have several different benefits. Firstly, as the modification request is only forwarded from the local database system if the modification request is allowed by the user permissions then the document database has its load reduced because it does not need to receive and work on modification requests that are not allowed by the permissions. This also reduces the amount of traffic across the network connection between the main database system and the local database system. This embodiment may also have the benefit that a handheld telecommunications device without access permission to the main database system can modify or be used to modify the document database. This provides the ability to modify the document database without giving permission to access the document database.

This embodiment may further have the benefit of granting access to a document database to an un-trusted user. The permissions granted to the un-trusted user can also be controlled in a granular fashion. The user can be granted independent read and write permissions to different parts of a document database.

In some embodiments the handheld telecommunications device may be battery powered.

In another embodiment the handheld telecommunications device may be a smartphone.

In another embodiment there may be many or multiple external users which have access to the local database system. This for example may provide multiple external users access to the document database provided by the main database system.

In another embodiment the handheld telecommunications device contains a cryptographic credential which enables it to log onto the local database system to authenticate the user of the handheld telecommunications device as the external user.

In another embodiment after the synchronization of the local database instances there may be a message that is pushed out from the local database system to the handheld telecommunications device informing the external user that a modification of the document database has been performed successfully.

In another embodiment the handheld telecommunications device hosts an application program. The method further comprises requesting a user document from the local database instance by the mobile telephone device via the digital mobile telecommunications connection. The method further comprises mapping the portion of the document database into the user document by the local database system. The local database system may for instance have a script of program or template which is used for performing this.

The application program is configured for displaying and/or editing the user document. The method further comprises sending the user document from the local database instance to the mobile telecommunications device via the digital mobile telecommunications connection. This embodiment may have the benefit of providing the handheld telecommunications device access to the permission of the document database without the use of special software or program.

In another embodiment the mapping of the local database instance is performed using a document template. This for instance may be beneficial because it may be able to automate the transformation of the portion of the document database into the user document automatically.

In another embodiment the document is an XML document. The use of XML may facilitate the use of a template for transforming the document into a form which the application program can use as a base document format. It may be readily able to transform the portion of the document database into the user document.

In another embodiment the method further comprises sending a modified document from the mobile telecommunications device to the local database connection via the digital mobile telecommunications connection. The modified document comprises the modification request. The method further comprises extracting the modification request from the modified document by the local database instance. For example if the document is an XML document it may be possible to examine the change in the XML document and generate the modification request automatically. The method may also include receiving modifications to the document and then saving them as the modified document.

In another embodiment extracting the modification request from the modified document by the local database system comprises comparing the user document to the modified document. This may be used to generate a mapping which lists the changes or differences which are listed or used to generate the modification request. This may be beneficial in automating the generation of the modification request.

In another embodiment the method further comprises annotating the user permissions to the user document before sending the user document to the mobile telecommunications device. This may be useful because the annotations may be used to display within the application program so that the user knows which permissions the user has to modify for the user document. For example the text or font could be changed or text could be highlighted to indicate various permissions.

In another embodiment the creation of the local database instance is performed on the fly in response to a request from the handheld telecommunications device. For example the handheld telecommunications device may attempt to log into the local database system or a computer system which hosts the local database system and it may create an instance of the local database system on the fly. This may be beneficial in providing access to the document database for multiple users.

In another embodiment the modification of the document database with the medication request is performed using journaling. This may be beneficial in identifying the modification of the modifications made to the document database made by multiple users or in correcting errors.

In another aspect the disclosure provides for a local database system. The local database system is configured for connecting to a first network connection with the main database system. The main database system and the local database system are separated by a first firewall. The local database system is further configured for connecting to a handheld telecommunications device via digital mobile telecommunications connection. The local database system and the handheld telecommunications device are separated by a second firewall. The local database system comprises a memory for storing machine-executable instructions. The local database system comprises a processor. Wherein execution of the machine-executable instructions cause the processor to create a local database instance. Execution of the machine-executable instructions further cause the processor to receive user permissions from the main database system through a database tunnel implemented using the first network connection.

The database tunnels through the first firewall. Execution of the machine-executable instructions further cause the processor to receive a portion of a document database via the database tunnel. Execution of the machine-executable instructions further cause the processor to receive a modification request from the handheld communication device to the local database instance through the digital mobile telecommunications connection. The digital mobile telecommunications connection tunnels through the second firewall. The second database tunnels through the first firewall. The modification request specifies a modification of the portion of the document database. Execution of the machine-executable instructions further cause the processor to forward the modification request from the local database instance to the main database system via the database tunnel if the modification request is allowed by the user permissions. Execution of the machine-executable instructions further causes the processor to synchronize the local database instance with the document database through the first database tunnel. The advantages of this embodiment have been previously discussed.

In another embodiment the handheld telecommunications device hosts an application program. Execution of the machine-executable instructions further causes the processor to receive a request for the user document. This is performed by the mobile telephone device via the digital mobile telecommunications connection. Execution of the machine-executable instructions further cause the processor to map the portion of the document database into the user document by the local database system. Execution of the machine-executable instructions further cause the processor to send the user document from the local database system to the mobile telecommunications device via the digital mobile telecommunications connection. The advantages of this embodiment have been previously discussed.

In another embodiment execution of the machine-executable instructions further cause the processor to receive a modified document from the mobile telecommunications device via the digital mobile telecommunications connection. The modified document comprises the modification request. Execution of the machine-executable instructions further cause the processor to extract the modification request from the modified document.

In another embodiment extracting the modification request from the modified document comprises comparing the user document to the modified document.

In another embodiment execution of the machine-executable instructions further causes the processor to annotate the user permissions to the user document before sending the user document to the mobile telecommunications device. The advantages of this embodiment have been previously discussed.

In another aspect the disclosure provides for a communication system comprising a local database system according to an embodiment. The communication system further comprises the main database system. The communication system further comprises the first network connection for exchanging data between the main database system and the local database system. The main database system and the local database system are separated by the first firewall. The communication system further comprises the handheld telecommunications device. The communication system further comprises the digital mobile telecommunications connection between the handheld telecommunications device and the local database system. The local database system and the handheld telecommunications device are separated by the second firewall. The digital mobile telecommunications connection tunnels through the second firewall. The advantages of this embodiment have been previously discussed.

It is understood that one or more of the aforementioned embodiments of the disclosure may be combined as long as the combined embodiments are not mutually exclusive.

BRIEF DESCRIPTION OF THE DRAWINGS

In the following embodiments of the disclosure are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
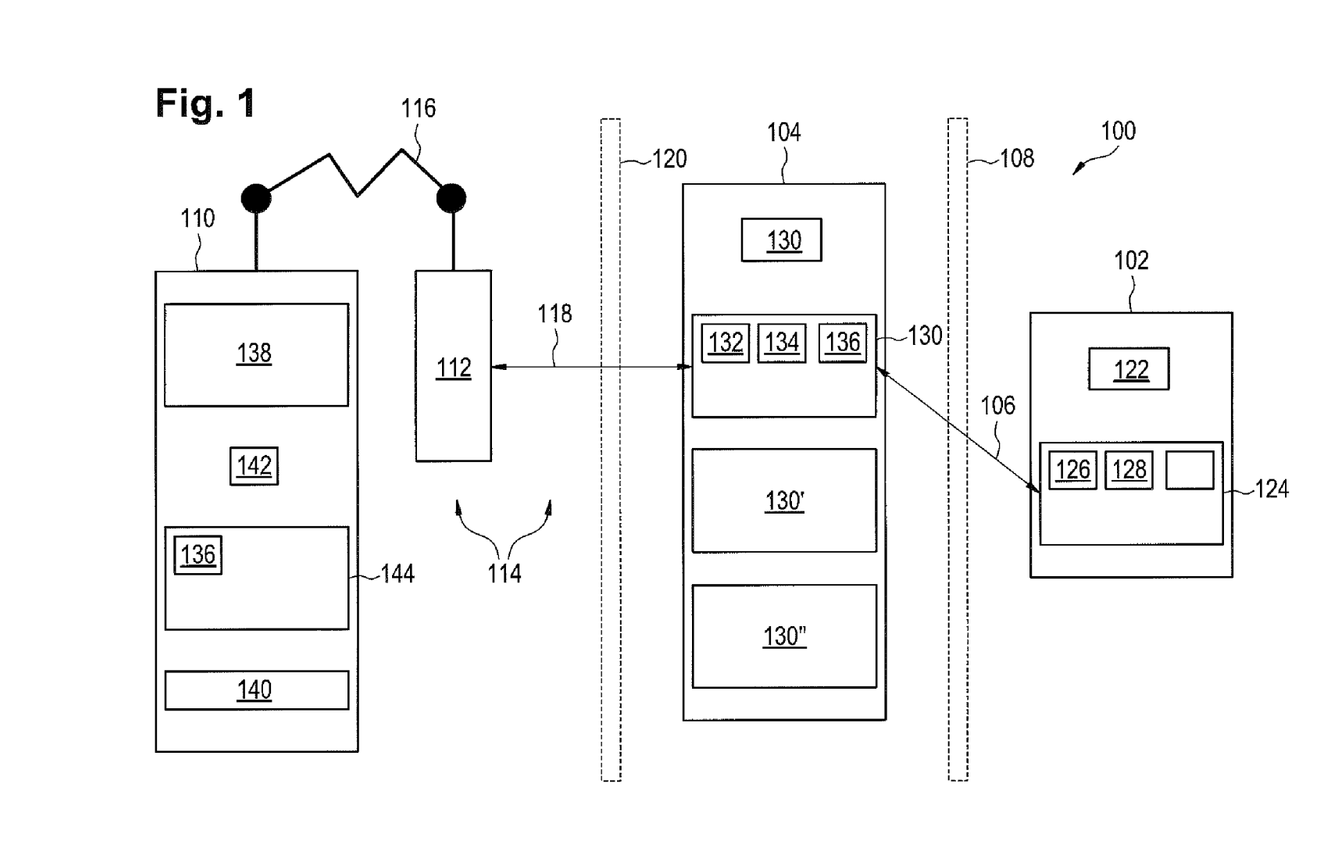
FIG. 1 illustrates an example of a communications system.

FIG. 1 shows a diagram which illustrates an example of a communication system 100. The communication system 100 comprises a main database system 102. The communication system further comprises a local database system 104. The diagram shows a first network connection 106 that allows the local database system 104 to exchange data with the main database system 102. There is a first firewall 108 across the first network connection 106. The communication system 100 further comprises a handheld telecommunications device 110. The handheld telecommunications device is connected to the local database system 104 via a digital mobile telecommunications connection 114. This for example may be constructed from a variety of wireless and wired components. In this example there is a base station 112 which forms a radio link 116 between the base station 112 and the handheld telecommunications device 110. There is then a wired connection or internet connection between the base station 112 and the local database system 104. The components 112, 116 and 118 are considered to be part of the digital mobile telecommunications connection 114. The wired connection 118 is shown as passing through a second firewall 120. The first 108 and second 120 firewalls serve to isolate the main database system from the handheld telecommunications device 110.

The main database system 102 is shown as comprising a processor 122. The processor runs a database management system 124. Within the database management system 124 there is a document database 126 and a set of permissions 128 for the document database 126.

On the local database system 104 there are a number of local database instances 130, 130', 130". These are also database management systems. The database management system 130 is shown as having user permissions 132 and a portion of the document database 134. There is also a modification request 136 that has been received from the handheld telecommunications device 110.

The handheld telecommunications device 110 is shown as containing a touch screen 138. The handheld telecommunications device 110 further comprises a battery 140 and a processor 142. The handheld telecommunications device 110 further has a memory 144 which stores the modification request 136 that is to be transferred via the digital mobile telecommunications connection 114.

In some modifications of FIG. 1 there may be multiple users. Other hand held communication devices may connect to the local database system also. There may also be trusted clients that are within the first firewall that connect directly to the main database system for access to the document database. When the data synchronization is successful with the main document database, every user (even from different systems) may be notified that their changes are successfully included in the Main Document Database.

Figure 2:
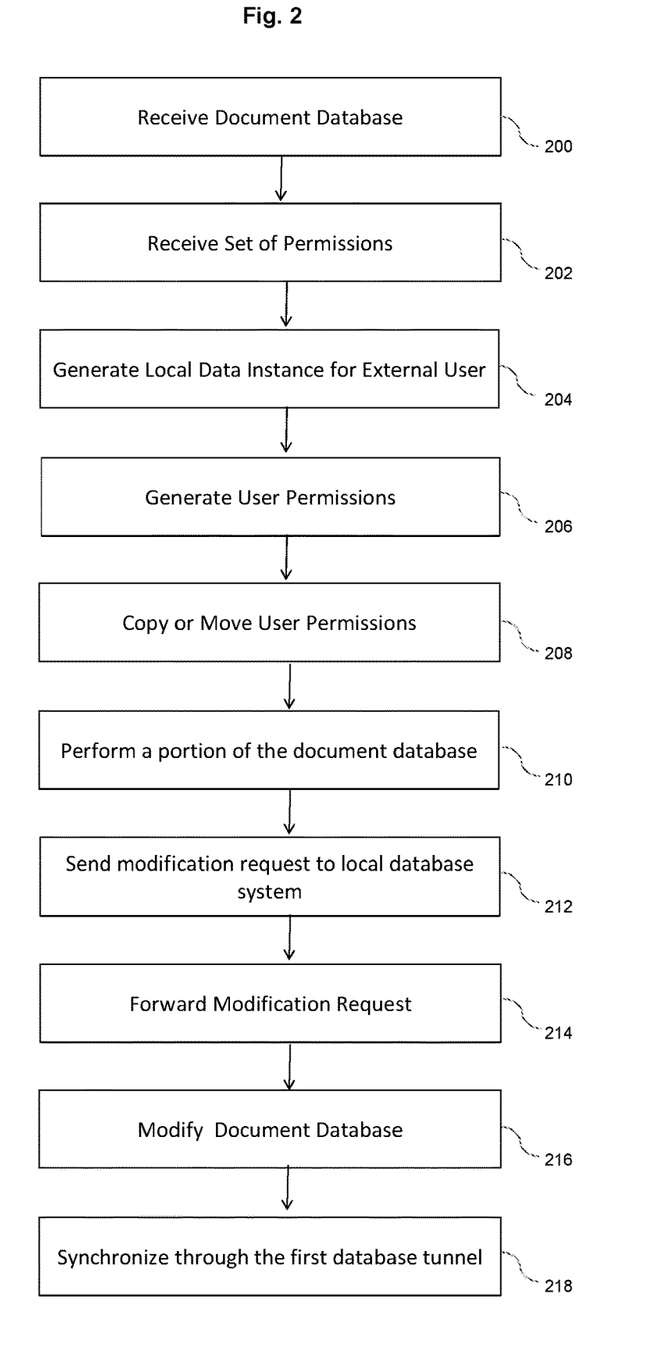
FIG. 2 shows a flow chart which illustrates a method of operating the communication system of FIG. 1.

FIG. 2 shows a flowchart which illustrates a method of operating the communication system 100 shown in FIG. 1. First in step 200 the main database system 102 receives the document database 126. The document database 126 comprises multiple entries. Next in step 202 the main database system 102 receives the set of permissions 128 for the document database 126. The set of permissions specifies read permissions and write permissions for each of the multiple entries separately for each of a group of users. Next in step 204 the local database instance 130 is generated on the local database system 104 for an external user. The external user is one of the group of users. This for example may be performed in response to a query from the mobile handheld telecommunications device 110. Next in step 206 the main database system 102 generates the user permissions 134. The user permissions are a subset of the set of permissions that grant read or write permissions to the external user. This for instance may be done with an SQL query to the database management system 124.

Next in step 208 the user permissions 134 are copied or moved from the main database system 102 to the local database instance 130 by pushing the set of user permissions through a database tunnel. The database tunnel is via the first network connection 106 and tunnels through the first firewall 108. Next in step 210 a portion of the document database 134 is performed from the main database system 102 to the local database instance 130 by pushing the portion 134 through the database tunnel. Next in step 212 the handheld telecommunications device 110 sends the modification request 136 to the local database system 104 through the digital mobile telecommunications connection 114. The modification request specifies the modification of the portion of the document database 134.

In step 214 the local database instance 130 forwards the modification request 136 to the main database system 104 if the modification request is allowed by the user permissions 132. Next in step 216 the document database 126 is modified using the modification request 136 if the modification request is allowed by the set of permissions 128. In this case the modification to the document database is verified twice. Finally then in step 218 the portion of the document database 134 and the modified document database 126 are synchronized through the first database tunnel.

Figure 3:
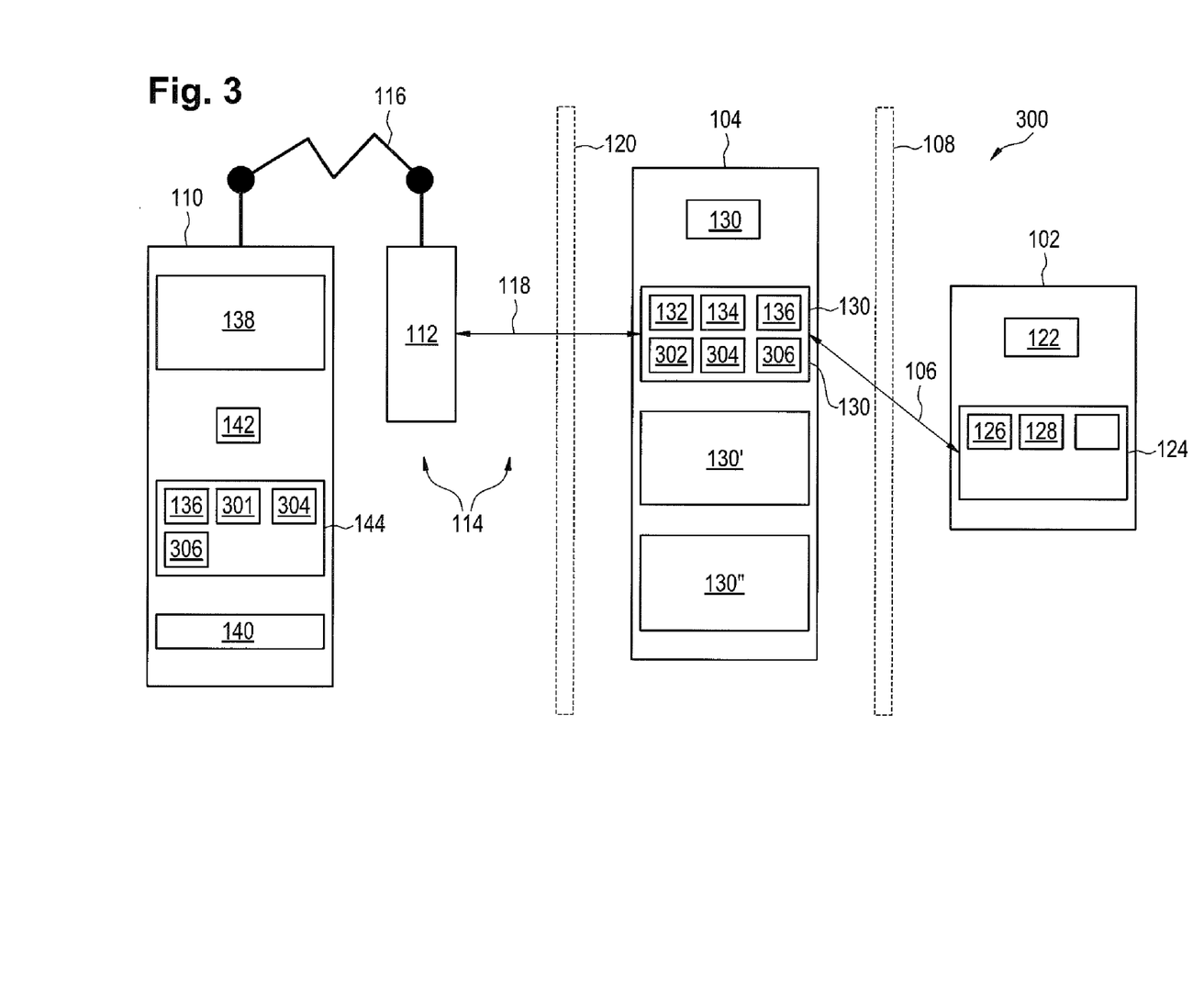
FIG. 3 illustrates a further example of a communications system.

FIG. 3 shows an example of a communication system 300 that is similar to the communication system 100 in FIG. 1 with several additional features. In this example the memory 144 of the handheld telecommunication device 110 is shown as hosting an application program 301 that can be run by the processor 142. The database management system 130 is shown as hosting a template 302 which can be used to generate the user document 304 from the portion of the database 134. The user document 304 has been copied to the memory 144. The application program 304 can then open the user document 304 and the user interface 138 can be used to receive modifications to the user document to create the modified document 306. The modified document 306 is shown in the memory 144 and may be copied back to the database management system 130. In some instances the template 302 can then be used to generate or create the modification request 136.

Figure 4:
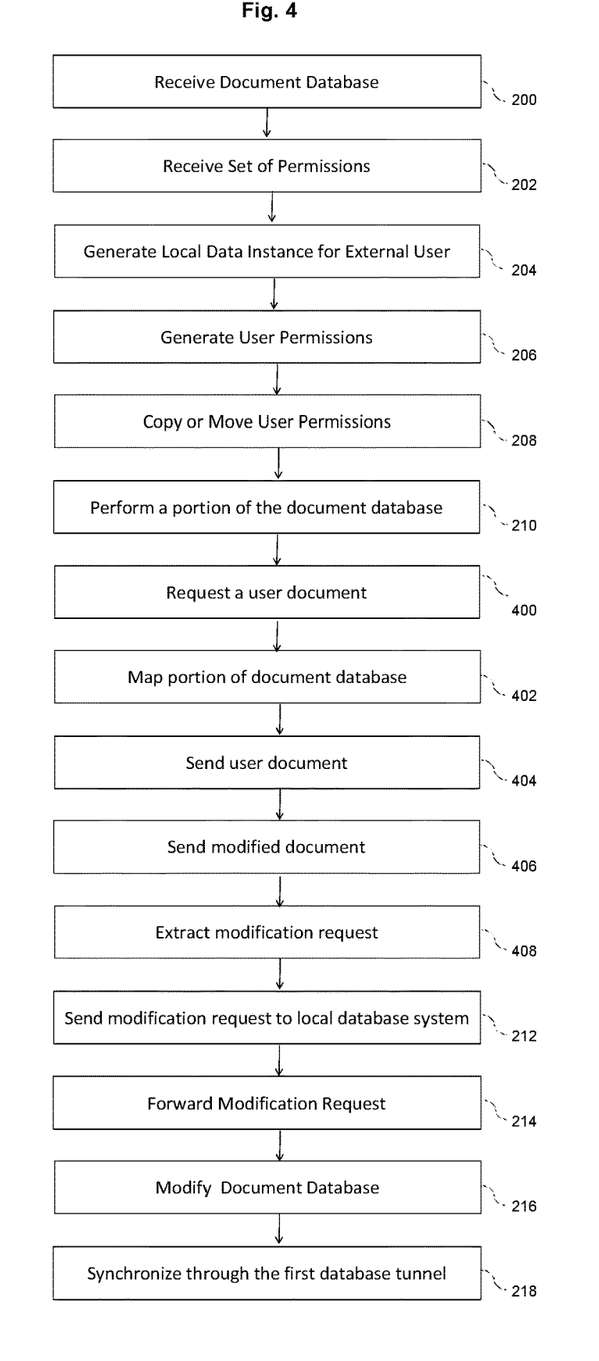
FIG. 4 shows a flow chart which illustrates a method of operating the communication system of FIG. 3.

FIG. 4 shows a flowchart which illustrates a method of operating the communication system 300. The method shown in FIG. 4 is similar to the method shown in FIG. 2.

Steps 400, 402, 404, 406 and 408 have been added between steps 210 and 212. After step 210 step 400 is performed. In step 400 the handheld telecommunications device 110 requests a user document from the local database system 130. Next in step 402 the local database instance 130 maps the portion of the document database 134 into the user document. In this example the template 302 is used for the mapping. Next in step 404 the local database instance sends the user document 304 to the handheld telecommunications device 110. Then in step 406 the mobile telecommunications device 110 sends the modified document 306 to the local database instance via the digital mobile telecommunications connection 114. Then in step 408 the local database instance 130 extracts the modification request 136 from the modified document 306. The method then proceeds from step 408 to step 212 as described in FIG. 2. The application program may display the user document on the screen 138 and then receive input from the screen to generate the modified document 306.

In some examples a user (document owner) in the backend on premise system (the main database system) creates a document and when the user wants to collaborate the same with other users from different systems in the different network, the document owner assign other users from different systems (the group of users) for different sections of the document (with different access rights) in which they have to work (these are the set of permissions). The same user can be assigned to different sections of the document with different access rights by the document owner. The users from different systems for different sections of the document form a group and collaborate of that specific section of the document. Thus the document has multiple groups with different users assigned with different access rights in each group.

The users are classified to different user categories like partner, customer, employee, etc. based on which the trust of them is authenticated by the system. When the partner access the specific section of the document, he works on the specific section as per his rights and the data is validated against the local rules and when the validations are successful the data is merged with the main document in the backend system. Each specific section of the document may have a logging system which preserves the old data and logs who makes changes on what fields, with the time and the reason for making the changes (like a change log or journaling system).

When the customer access the specific section of the document, he works on the local copy of the specific section as per his rights and the data is validated against the local rules and when the validations are successful the data is merged with the main document in the backend system. Each specific section of the document has a logging system which preserves the old data and logs who makes changes on what fields, with the time and the reason for making the changes (like a change log). The local rules which are relevant for the user and for that specific documents are stored in the system which are accessed by the partners, customers etc. This solution helps to collaborate among different users from different systems without duplicate group creation and work with the same transaction document from different systems across a heterogeneous network. The documents are stored in the on premise systems (CRM, ERP etc.) which are in the intranet behind the firewall (first firewall).

The framework (or communication system) may provide the option to work in the same data from the source system or to work using the copy of the data according to the configuration based on this configuration, either the replication of the document and the group data happens or they are not replicated.

If the framework is configured to work using the same data, in this case the data is pulled from the source system (main database system) in real time (calling remote tables as virtual tables in the current system) and the needed activities are done in the document by an user. Options are provided in the framework to provide authorization only to the certain sections of the document so that the partner access only that section of the document. Even the visibility of the fields in the document can be configured as per the needs so that all the details are not available to all users from different systems. The framework provides the options to control visibility, authorization rights to different sections of the document based on the different systems in the network from which the document can be changed by different categories of the users.

Hence in this scenario, the data is not replicated and the users from different systems work on the same data which is in the source system based on different authorization rights in different sections of the document within the same group. The document can have multiple groups also with different security options for different users from same and different systems also.

When the data is replicated to different systems from the source systems where the users are working, the users work on the local copy of the data within the same group (for which they are authorized) and the data is synchronized (by DB Tunneling using the DB Ports) between different systems based on the same document and the group name. In this scenario also the framework provides the options to control visibility, authorization rights to different sections of the document based on the different systems in the network.

Irrespective of the Replication scenario, there can be multiple groups for the document and there can be multiple users in these multiple groups with different access rights from multiple systems. The same user can participate in multiple groups with different access rights for different sections of the document for the same and from different systems in the network. Based on the different privacy options in the group and based on the user rights, the user can invite others to a specific group in a specific document from a specific system also.

Options are provided in the framework to customize in field level for every object so that the user can receive the feeds only when there are changes for this specific field. The user can receive update from any transactions for which he has been subscribed (based on the changes in transactions). The updates (as feeds) are sent to different users in different systems across different networks. The objects for which the feeds have to be received should be maintained in the customizing. options are provided to customize in field level for every object.

The users from different systems are made available in, for example, a JAM system/Collaboration Platform so that they can collaborate with each other from multiple systems. The activities and feeds are made available to the users in their on demand and on premise CRM systems. The framework avoids creating duplicate groups in on demand and on premise systems by replicating the needed transaction and groups data accordingly across PI in different systems across the different networks. The users (who need to collaborate) from different systems have to be synchronized with the JAM system. The users should be linked to the right accounts with proper administrative rights in the JAM system.

The data from the DMZ CRM system may be stored in the Internal CRM system via virtual table usage. There are different events triggered in Internal CRM system based on the data from the DMZ CRM system since the logic resides in the internal CRM system. The number of calls is optimized by storing the needed customizing data in shared memory of DMZ CRM system.

There are local rules (The user permissions in the local database system) and the generic/global rules (in intranet CRM systems). First the user request is authenticated by the identity provider and the user is authorized for that specific document in the on demand system. When the user does some specific changes, it is validated against the local rules in that specific system. If the local rules validation fails the user is informed about the same immediately in that on demand system.

When the local rules are successfully validated the data is stored locally in the local database and then the authorization checks happen in the CRM intranet system for the user request and when it's successfully validated the user request data is validated against the generic/global rules. If the validation is successful means the data is synchronized with the intranet CRM system. If the validation for the generic/global rules fails in the intranet CRM systems means the user is informed about the same in the on demand system and no data is synchronized with the intranet CRM system from the on demand system (the local database system).

Every document may have generic rules which is applicable for a set of common documents and document specific rules which are applicable for that document alone. There are system specific rules also in which user is working on a specific document. Every document can have multiple groups and every group can have local rules and generic/global rules. Every group can have same/different users assigned with different authorization rights for different sections of the document based on the different user categories and based on different systems in the network.

The local rules (user permissions) are stored in the on demand systems database and the generic/global rules may be stored in the intranet CRM systems database. The generic rules are always stored in the backed systems like CRM, ERP etc. due to security reasons.

The framework ensures the appropriate data quality for each object by validating the data against specific set of rules before distribution. When the data is successfully distributed the logging in done in the logging and tracking tables. The framework checks for object completeness before distribution. It may take care of dependent objects distribution also if needed and thus providing an intelligent replication mechanism. For example, when opportunity data has to be distributed, the relevant objects like employee details, partner details, relevant partner function, etc. related to that opportunity has to be distributed for completeness and to avoid any error in the distributed system. The framework allows for different configuration, mapping according to different processes options are provided to check dependencies between different objects and between different attributes of an object also. The customizing allows defaulting values and activating mandatory checks if needed. Events can be triggered based on specific values and the order of event triggering can also be customized based on the specific requirements.

An infrastructure/connectivity layer ensures user authentication and supports by establishing proper Technical connectivity with other connected systems and establishes the secure tunnel between these systems to ensure proper remote communication and data transfer. The remote communication will be based on REST via the http client and DB tunneling using ports.

A process layer may the request management and does the data transformation between different Technical formats like XML, OData, etc. so that the other layers can understand and process further. The database layer takes care of sending the data to the right tables based on the different user activities in various transactions.

An object layer manages different entities like user, feed, activities, etc. based on the user action in the application (from any connected System) and it maintains the data in a generic model which is translated by the process layer to a specific representation which can be understood by the target systems.

The communication layer helps to establish a reliable communication between the object layer and the notification receiver so that the right objects are associated with the right notifications for the relevant user group in different associated systems. This helps in pushing the feeds to different systems in the network. The notification receiver receives the specific changes from different users regarding the different objects for different systems and displays them to the UI.

The integration layer may help to integrate the user group and the notifications to the different objects associated with different systems. The notification trigger component identifies the necessary changes in the application by the end user and sent these changes to the notification publisher layer.

A notification publisher layer collects all the changes done in a single session by the single user and dispatches to notification receiver component for dispatching to the interested stakeholders for the specific changes in the object.

A customizing layer has the different objects which need to be collaborated between different users groups between different systems are maintained here.

An implementation layer has different objects specific logic which has to be executed can be maintained here. It can support in objects specific authorization checks, mandatory field checks, field validation checks, and proper message handling etc.

Most of the time the database instances in the cloud are protected by a firewall, which means, they are not directly accessible. Access to remote database instances is therefore only possible through a database tunnel, which provides a secure connection from one machine to another machine and bypasses the firewall.

A database tunnel allows connecting to the remote database instance and provides direct access to a schema and allows manipulating it at database level. By having the data locally in the other remote systems supports offline capabilities (when no connectivity with the main database system or main server) also when the network connection to the main system is not available.

The basic concept of offline enablement is to provide a copy of the necessary data mainly all data that is required for the operation of the application in a local database on the remote systems and let the application manipulate this database even without network connection. Initially, the need to replicate the data from the online OData service (from the main system) to the remote system local database once and during normal operation, the need to synchronize between the data sources based on successful validation. Both the initial data replication and the regular synchronization need network connection, but the data in the local system can be manipulated without network connection.

Synchronization is a process of data exchange between remote data source clients and a main data source. During this process, the client must establish and maintain a session with the main server. If successful, the session leaves the remote and main databases in a mutually consistent state.

The client normally initiates the synchronization process. It begins by establishing a connection to the main server.

The synchronization logic can also be specified with data synchronization scripts. The control of the synchronization process is done by data synchronization scripts and storing or referencing them in remote data system. This helps to maintain the data consistency and transactional Integrity of the data. Scripts may define how data is taken from the source and target systems, what data should be merged and on what basis; and how authentication takes place during synchronization Scripts can be individual statements or sequence of statements. Thus the framework ensures the appropriate data quality for each object by validating the data against specific set of rules before distribution. When the data is successfully distributed the logging is done. The framework checks for object completeness before distribution. It takes care of dependent objects distribution also if needed and thus providing an intelligent replication mechanism. For example, when opportunity data has to be distributed, the relevant objects like employee details; partner details, relevant partner function etc. related to that opportunity has to be distributed for completeness and to avoid any error in the distributed system. The framework allows for different configuration, mapping according to different processes. Options are provided to check dependencies between different objects and between different attributes of a same object also. The customizing allows defaulting values and activating mandatory checks if needed. Events can be triggered based on specific values and the order of event triggering can also be customized based on the specific requirements.

LIST OF REFERENCE NUMERALS 100 communication system
102 main database system
104 local database system
106 first network connection
108 first firewall
110 handheld telecommunications device
112 base station
114 digital mobile telecommunications connection
116 radio link
118 wired connection
120 second firewall
122 processor
124 database management system
126 document database
128 set of permissions
130 local database instance (DBM)
130' local database instance
130" local database instance
132 user permissions
134 portion of document database
136 modification request
138 touch screen
140 battery
142 processor
144 memory
200 receiving a document database in the main database system
202 receiving a set of permissions for the document database
204 generating a local database instance on the local database system for an external user
206 generating user permissions for the local database instance by the main database system
208 copying the user permissions from the main database system to the local database instance by pushing the set of user permissions through a database tunnel
210 copying a portion of the document database from the main database system to the local database instance by pushing the portion through the database tunnel, wherein the portion is selected from entries of the document database which are present in the user permissions
212 sending a modification request from the handheld communication device to the local database system through the digital mobile telecommunication connection, wherein the modification request specifies a modification of the portion of the document database 214 forwarding the modification request from the local database instance to the document database if the modification request is allowed by the user permissions
216 modifying the document database using the modification request from the local database system to the main database system if the modification request is allowed by the set of permissions
218 synchronizing the portion of the document database with the modified document database through the first database tunnel
300 communication system
301 application program
302 template
304 user document
306 modified document
400 requesting a user document from the local database instance by the mobile telephone device via the digital mobile telecommunication connection
402 mapping the portion of the document database into the user document by the local database instance
404 sending the user document from the local database instance to the mobile telecommunication device via the digital mobile telecommunication connection.
406 sending a modified document from the mobile telecommunication device to the local database connection via the digital mobile telecommunication connection
408 extracting the modification request from the modified document by the local database instance

The invention claimed is:

1. A telecommunication method using a communication system, the communication system including a main database system, a local database system, a first network connection, a handheld telecommunications device, and a digital mobile telecommunication connection between the handheld telecommunications device and the local database system, the first network connection exchanging data between the main database system and the local database system, the main database system and the local database system being separated by a first firewall, the local database system and the handheld telecommunications device being separated by a second firewall, the digital mobile telecommunication connection tunneling through the second firewall, the method comprises:
receiving a document database in the main database system, the document database including multiple entries, the document database corresponding to a document;
receiving a set of permissions for the document database, the set of permissions specifying read permissions and write permissions for each of the multiple entries separately for each of a group of users;
generating a local database instance on the local database system for an external user of the group of users;
generating user permissions for the local database instance by the main database system, the user permissions being only a subset of the set of permissions associated with the external user;
copying the user permissions from the main database system to the local database instance by pushing the user permissions through a database tunnel that tunnels through the first firewall;
copying a portion of the document database from the main database system to the local database instance by pushing the portion through the database tunnel, the portion being selected from entries of the multiple entries which are included in the user permissions, the portion being a subset of the document database that the external user has read or write permission for;
receiving, by the local database instance, a request for a user document from the handheld telecommunications device via the digital mobile telecommunication connection;
mapping the portion into the user document by the local database instance;
sending the user document from the local database instance to the handheld telecommunications device via the digital mobile telecommunication connection, the handheld telecommunications device including an application program configured to display or modify the user document;
receiving, by the local database instance, a modified document from the handheld telecommunications device via the digital mobile telecommunication connection, the modified document including a modification request specifying a modification of the portion;
extracting the modification request from the modified document by the local database instance;
forwarding the modification request from the local database instance to the document database only if the modification request is allowed by the user permissions;
modifying the document database using the modification request from the local database system if the modification request is allowed by the set of permissions; and
synchronizing the portion that has been copied to the local database system with the modified document database through the database tunnel.

2. The telecommunication method of claim 1, wherein the mapping the portion is performed using a document template.

3. The telecommunication method of claim 2, wherein the document is an XML document.

4. The telecommunication method of claim 1, wherein the extracting the modification request includes comparing the user document to the modified document.

5. The telecommunication method of claim 1, wherein the method further comprises:
annotating the user permissions by the local database instance before the sending the user document, the user permissions corresponding to the user document.

6. The telecommunication method of claim 1, wherein the generating the local database instance is performed on the fly in response to receiving a corresponding request from the handheld telecommunications device.

7. The telecommunication method of claim 1, wherein the modifying the document database is performed using journaling.

8. A local database system, wherein the local database system is configured to connect with a main database system via a first network connection, the main database system and the local database system being separated by a first firewall, the local database system being further configured to connect to a handheld telecommunications device via a digital mobile telecommunication connection, the local database system and the handheld telecommunications device being separated by a second firewall, the digital mobile telecommunication connection tunneling through the second firewall, the local database system comprises:
a memory configured to store machine executable instructions; and
at least one processor configured to execute the machine executable instructions to
create a local database instance, receive user permissions from the main database system through a database tunnel implemented using the first network connection, the database tunnel tunneling through the first firewall, receive a portion of a document database via the database tunnel, receive a request for a user document from the handheld telecommunications device via the digital mobile telecommunication connection, map the portion into the user document, send the user document to the handheld telecommunications device via the digital mobile telecommunication connection, the handheld telecommunications device including an application program configured to display or modify the user document, receive a modified document from the handheld telecommunications device via the digital mobile telecommunication connection, the modified document including a modification request specifying a modification of the portion, extract the modification request from the modified document, forward the modification request to the main database system via the database tunnel only if the modification request is allowed by the user permissions, and synchronize the local database instance with the document database through the database tunnel.

9. The local database system of claim 8, wherein the extraction of the modification request includes comparing the user document to the modified document.

10. The local database system of claim 8, wherein the at least one processor is further configured to execute of the machine executable instructions to annotate the user permissions before the user document is sent to the handheld telecommunications device, the user permissions corresponding to the user document.

11. A communication system comprising:
a handheld telecommunications device;
a main database system;
a first network connection configured to exchange data between the main database system and a local database system, the local database system being configured to connect to the main database system via the first network connection, the main database system and the local database system being separated by a first firewall;
a digital mobile telecommunication connection between the handheld telecommunications device and the local database system, the local database system being configured to connect to the handheld telecommunications device via the digital mobile telecommunication connection, the local database system and the handheld telecommunications device being separated by a second firewall, the digital mobile telecommunication connection tunneling through the second firewall; and
the local database system including
a memory configured to store machine executable instructions, and
at least one processor configured to execute the machine executable instructions to
create a local database instance,
receive user permissions from the main database system through a database tunnel implemented using the first network connection, the database tunnel tunneling through the first firewall,
receive a portion of a document database via the database tunnel, the document database corresponding to a document,
receive a request for a user document from the handheld telecommunications device via the digital mobile telecommunication connection,
map the portion into the user document,
send the user document to the handheld telecommunications device via the digital mobile telecommunication connection,
receive a modified document from the handheld telecommunications device via the digital mobile telecommunication connection, the modified document including a modification request specifying a modification of the portion,
extract the modification request from the modified document,
forward the modification request to the main database system via the database tunnel only if the modification request is allowed by the user permissions, and
synchronize the local database instance with the document database through the database tunnel.

12. The communication system of claim 11, wherein the extraction of the modification request includes comparing the user document to the modified document.

13. The communication system of claim 11, wherein the at least one processor is further configured to execute the machine executable instructions to annotate the user permissions before the user document is sent to the handheld telecommunications device, the user permissions corresponding to the user document.

14. The communication system of claim 11, wherein the portion is mapped using a document template, and the document being an XML document.

* * * * *